(12) United States Patent
Nishida

(10) Patent No.: US 8,199,167 B2
(45) Date of Patent: Jun. 12, 2012

(54) DIAGNOSTIC SUPPORT DEVICE AND DIAGNOSTIC SUPPORT SYSTEM

(75) Inventor: Osamu Nishida, Taki-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 777 days.

(21) Appl. No.: 12/296,550

(22) PCT Filed: Feb. 2, 2007

(86) PCT No.: PCT/JP2007/051772
§ 371 (c)(1),
(2), (4) Date: Oct. 9, 2008

(87) PCT Pub. No.: WO2007/132576
PCT Pub. Date: Nov. 22, 2007

(65) Prior Publication Data
US 2009/0201315 A1    Aug. 13, 2009

(30) Foreign Application Priority Data
May 15, 2006   (JP) .................................. 2006-135765

(51) Int. Cl.
*G09G 5/00* (2006.01)
*B60Q 1/00* (2006.01)
*G06F 9/44* (2006.01)
(52) U.S. Cl. ......................... 345/634; 340/461; 703/20
(58) Field of Classification Search .................. 340/461; 703/20
See application file for complete search history.

(56) References Cited

U.S. PATENT DOCUMENTS

| | | | |
|---|---|---|---|
| 5,231,516 A | | 7/1993 | Kamon et al. |
| 5,764,139 A | * | 6/1998 | Nojima et al. ................ 340/461 |
| 2001/0019363 A1 | | 9/2001 | Katta et al. |
| 2004/0184612 A1 | | 9/2004 | Kohiyama et al. |
| 2005/0102098 A1 | | 5/2005 | Montealegre et al. |
| 2005/0195273 A1 | | 9/2005 | Yamamoto |
| 2008/0309474 A1 | * | 12/2008 | Okamoto et al. ............. 340/462 |

FOREIGN PATENT DOCUMENTS

| | | |
|---|---|---|
| DE | 199 35 892 A1 | 2/2001 |
| JP | 62-058110 A | 3/1987 |
| JP | 04-328420 A | 11/1992 |
| JP | 10-297319 A | 11/1998 |
| JP | 2000-238552 A | 9/2000 |
| JP | 2001-114027 A | 4/2001 |
| JP | 2001-320616 A | 11/2001 |
| JP | 2001-343929 A | 12/2001 |
| JP | 2002-154393 A | 5/2002 |
| JP | 2003-137007 A | 5/2003 |
| JP | 2003-320911 A | 11/2003 |
| JP | 2004-155395 A | 6/2004 |
| JP | 2004-157434 A | 6/2004 |
| JP | 2005-205997 A | 8/2005 |
| JP | 2006-234505 A | 9/2006 |
| WO | 2006/022191 A1 | 3/2006 |
| WO | 2006/022228 A1 | 3/2006 |

OTHER PUBLICATIONS

Official Communication issued in International Patent Application No. PCT/JP2007/051772, mailed on Mar. 20, 2007.

(Continued)

*Primary Examiner* — Kee M Tung
*Assistant Examiner* — Sing-Wai Wu
(74) *Attorney, Agent, or Firm* — Keating & Bennett, LLP

(57) ABSTRACT

A diagnostic support device supports a diagnosis of a display state of a composite image displayed on a display device that is arranged to display a composite image obtained by combining a plurality of composite target images corresponding to pieces of information supplied from respective devices mounted on a vehicle, the plurality of composite target images being combined with reference to layout information, the diagnostic support device including a layout information obtaining section arranged to obtain the layout information, a layout information output section arranged to output to an image combining apparatus, the layout information, per composite target image, the image combining apparatus combining the plurality of composite target images, and the layout information being obtained by the layout information obtaining section.

6 Claims, 11 Drawing Sheets

OTHER PUBLICATIONS

Okamoto et al.: "Display System," U.S. Appl. No. 11/574,148, filed Feb. 23, 2007.
Fujimoto et al.: "Simulation Device, Simulation Program, and Simulation Method," U.S. Appl. No. 11/574,145, filed Feb. 23, 2007.
Okamoto et al.: "Display System," U.S. Appl. No. 12/406,374, filed Mar. 18, 2009.
Okamoto: "On-Vehicle Display System and Display Panel Control Device," U.S. Appl. No. 12/305,002, filed Dec. 16, 2008.
Tsubooka et al.: "Instrument Panel Display System For Mounting on Automobile, and Image Data Output Device," U.S. Appl. No. 12/293,881, filed Sep. 22, 2008.
Okamoto: "Display System, Display System Display Control Method, Data Display Program, and Recording Medium," U.S. Appl. No. 12/296,549, filed Oct. 9, 2008.
English translation of Official Communication issued in corresponding Chinese Patent Application No. 200910145233, mailed on Feb. 23, 2012.

* cited by examiner

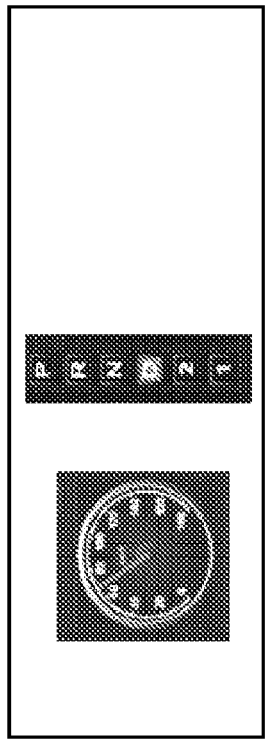
FIG.3D
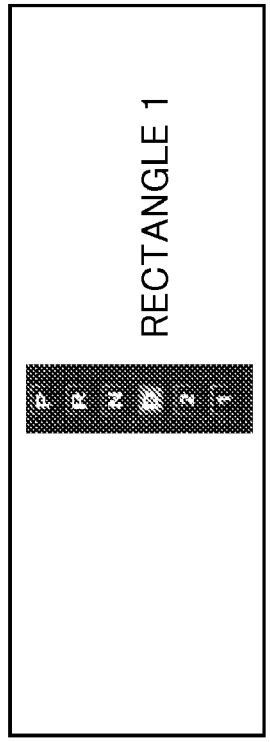
FIG.3A RECTANGLE 1
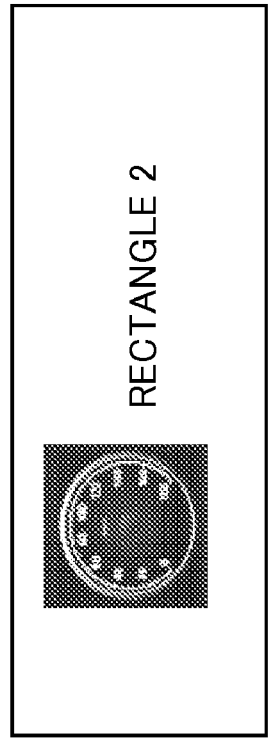
FIG.3B RECTANGLE 2
FIG.3C RECTANGLE 3

FIG.4

| | |
|---|---|
| PRE-PROCESSING | 000034b0 00 ab 02 00 30 66 d9 00 ;<br>000034b8 06 40 00 00 10 a6 5b 0f ;<br>000034c0 00 00 00 00 14 e1 df 0a ;<br>000034c8 01 e0 06 40 15 4c 02 01 ;<br>000034d0 00 00 00 00 16 e9 1f 00 ; |
| RECTANGLE 1 | 000034d8 00 00 00 01 01 ff 5e 00 ;<br>000034e0 01 e0 06 40 15 4f 02 02 ;<br>000034e8 00 00 00 01 01 ff 5e 00 ; |
| RECTANGLE 2 | 000034f0 01 e0 06 40 15 4e 52 03 ;<br>000034f8 00 00 00 01 01 ff 5e 00 ;<br>00003500 01 e0 06 40 15 49 02 04 ;<br>00003508 00 00 00 01 01 ff 5e 00 ; |
| RECTANGLE 3 | 00003510 01 e0 06 40 15 48 52 05 ;<br>00003518 00 00 00 01 01 ff 5e 00 ;<br>00003520 01 e0 06 40 15 4b 52 06 ;<br>00003528 00 00 00 01 01 ff 5e 00 ; |

BACKGROUND IMAGE

RECTANGLE 2    RECTANGLE 3 n=(x+1)th image     n=xth image (n=xth)

(n=(x+1)th)

DIAGNOSTIC SUPPORT DEVICE AND DIAGNOSTIC SUPPORT SYSTEM

BACKGROUND OF THE INVENTION

1. Field of the Invention

The present invention relates to a diagnostic support device and a diagnostic support system for supporting a diagnosis of a display status of a composite image displayed on an on-board display device for displaying, on an instrument panel, vehicle state information such as a vehicle speed and engine revolutions and additional information for assisting a driver, such as a navigation image.

2. Description of the Related Art

In recent years, an on-board display device for displaying additional information for assisting a driver, such as a navigation image in addition to car information such as vehicle speed and engine revolutions has been proposed (see Japanese Unexamined Patent Application Publication No. 9-123848).

According to Japanese Unexamined Patent Application Publication No. 9-123848, it is possible to allow a driver to drive comfortably and smoothly, by displaying for the driver, on a wide display, desired information corresponding to driving condition.

The layout of an image to be displayed on an instrument panel (hereinafter referred to as an instrument panel image) must be displayed in a manner suitable with a vehicle individually or in a manner according to a user's preference. For example, Japanese Unexamined Patent Application Publication No. 10-297319 discloses an instrument panel image selection device enabling a user to freely select a favorite instrument panel image.

The layout of an instrument panel image must generally be determined in a cautious manner for safety reasons. For this reason, it is necessary to finally determine the layout after sufficient consideration of each of the selected layouts. The same is true of both systems disclosed in Japanese Unexamined Patent Application Publication No. 9-123848 and Japanese Unexamined Patent Application Publication No. 10-297319, too.

However, the instrument panel displayed in accordance with a predetermined layout would look different in simulation and in actual driving.

Thus, the difference between the case of the simulation and the case of the actual driving can cause a problem with safety.

Therefore, International Publication WO 2006/022228 A1 discloses a simulation device which is an application development support tool in which a simulation close to the actual driving feel can be realized whereby an instrument panel image looks the same in simulation and actual driving.

The simulation device disclosed in International Publication WO 2006/022228 A1 has a command string which is a group of commands necessary for displaying, on a screen, a composite image that becomes an instrument panel image by combining a plurality of rectangular images (composite target images). The simulation device disclosed in International Publication WO 2006/022228 A1 can display a desired instrument panel image by executing the command string.

However, the look of the instrument panel image obtained by carrying out suitable simulation that is close to the actual driving feel may be different from the look of the display screen that a designer of the display screen has intended.

In this case, in the simulation apparatus disclosed in International Publication WO 2006/022228 A1, a diagnostic support system as shown in FIG. 11 is constructed, and a problem on a display screen of an instrument panel is examined.

That is, in the diagnostic support system shown in FIG. 11, an editing apparatus 1101 outputs commands one by one from a command string composed of a plurality of commands to an image combining section 1202 of an image combining apparatus 1201, the image combining apparatus 1202 reads a composite image (rectangular image) from a rectangular image storage section 1203, and the thus read image is displayed on an on-board display device 1301. Thus, the problem occurring on the display screen is examined.

The rectangular images in the on-board display 1301 are disposed or superimposed by executing combinations of a plurality of commands inputted into the image combining apparatus 1201. Therefore, by executing the commands one by one and looking at the display screen each time, in the end it is possible to find a problem occurring on the display screen. However, it takes a lot of time to find the problem.

Furthermore, even if the problem occurring on the display screen is found, it is very difficult to find a command causing the problem because the rectangular images are disposed or superimposed by combinations of a plurality of commands.

SUMMARY OF THE INVENTION

In order to overcome the problems described above, preferred embodiments of the present invention provide a diagnostic support device and a diagnostic support system in which a problem occurring on the display screen and a command causing the problem can be quickly and easily found.

A diagnostic support device according to a preferred embodiment of the present invention is a diagnostic support device arranged to support a diagnosis of a display status of a composite image displayed on an on-board display device arranged to display a composite image obtained by combining a plurality of composite target images corresponding to pieces of information supplied from respective devices mounted on a vehicle, the plurality of composite target images being combined with reference to layout information respectively corresponding to each of the plurality of composite target images, the diagnostic support device including a layout information obtaining section arranged to obtain the layout information, and a layout information output section arranged to output the layout information to an image combining apparatus, per composite target image, the image combining apparatus combining the plurality of composite target images, and the layout information being obtained by the layout information obtaining section.

The layout information includes commands such as scaling ratio, size of a displayed portion in partial display, display position of each of the composite target images and a processing (color and transparency) in an overlapping section.

According to the above arrangement, the layout information output section outputs the obtained layout information corresponding to each of the composite target images to the image combining apparatus arranged to combine the composite target images, and the composite image per composite target image can be displayed on the on-board display device.

This makes it possible for an operator of the diagnostic support device to confirm the composite image, per composite target image, displayed on the on-board display device, thereby making it easy to find a problem on the display caused by unaligned composite target images or the like.

Furthermore, because the layout information is outputted per composite target image, it is easy to find the layout information necessary for displaying the composite target images. This makes it possible to easily find the layout information corresponding to the target image that is assumed to have a problem, thereby making it easy to find a command that seems to have a problem from commands included in the layout information. As a result, it is possible to quickly and easily find and solve a problem occurring on the display screen.

Further, the layout information output section may be arranged so as to judge whether or not there is output instruction information for outputting layout information, and output the layout information per composite target image only when there is output instruction information.

Thus, by judging whether or not there is output instruction information for outputting layout information or not, and outputting the layout information per composite target image only when there is output instruction information, it is possible to clarify the relationship between the composite target image displayed on the on-board display device and the layout information.

Further, another arrangement is possible in which the diagnostic support device includes an input section arranged to input the output instruction information into the layout information output section which output the layout information when the output instruction information is inputted by the input section.

With this arrangement, if an operator of the diagnostic support device can input the output instruction information, it is possible for the operator to grasp the relationship between the layout information obtained by inputting the output instruction information and the composite target image displayed on the on-board display device.

The output instruction information may be inputted by the input section, as described above. Alternatively, the output instruction information may be included in the layout information. In this case, for example, the layout information includes information indicating the last of command string included in each of the layout information corresponding to a composite target image.

When the output instruction information is included in the layout information, it is possible to automatically output the composite target images one by one to the image combining apparatus, and therefore it is possible for the operator to find an image having a problem just by looking at images displayed on the on-board display device.

Further, another arrangement is possible in which the diagnostic support device further includes a selection section arranged to select the composite target images, and the layout information output section outputs the layout information per composite target image until the layout information corresponding to the composite target image selected by the selection section is outputted.

According to the above arrangement, when the layout information output section outputs the layout information per composite target image until the layout information corresponding to the composite target image selected by the selection section is outputted, it is possible to display composite images until the composite target image selected by the selection section on the on-board display device is displayed.

This achieves an increase in operational efficiency of diagnostic support processing in the diagnostic support device because it is only necessary for a diagnostician to select the target image, and the composite images are automatically displayed on the on-board display device until thus selected composite target image is displayed.

A diagnostic support system according to a preferred embodiment of the present invention includes an image combining apparatus arranged to combine a plurality of composite target images corresponding to information supplied from respective devices mounted on a vehicle, the plurality of composite target images being combined with reference to layout information respectively corresponding to each of the composite target images; an on-board display device arranged to display a composite image combined by the image combining apparatus; and a diagnostic support device arranged to support a diagnosis of display status of a composite image displayed on the on-board display device, the diagnostic support device including a layout information obtaining section arranged to obtain the layout information; and a layout information output section arranged to output the layout information to an image combining apparatus, per composite target image, the layout information being obtained by the layout information obtaining section, the image combining apparatus including a composite target image storage section arranged to store the plurality of target images; and an image combining section arranged to combine the composite target images with reference to the layout information and output the composite image to the on-board display device.

According to the above arrangement, when the layout information output section included in the diagnostic support device outputs, to the image combining apparatus, the obtained layout information, per composite target image, it is possible to display the composite image, per target image, on the on-board display device.

This makes it possible for an operator of the diagnostic support device to confirm the composite image, per composite target image, displayed on the on-board display device, thereby making it easy to find a problem occurring on the display caused by unaligned composite target images and the like.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 3A through 3D are diagrams showing exemplary layout in an instrument panel screen in accordance with combinations of rectangular images.

FIG. 4 is a diagram showing relationship between rectangles stored in a layout information storage section included in the diagnostic support device shown in FIG. 1 and command strings.

DETAILED DESCRIPTION OF PREFERRED EMBODIMENTS

Preferred embodiments of the present invention are described below.

Figure 2:
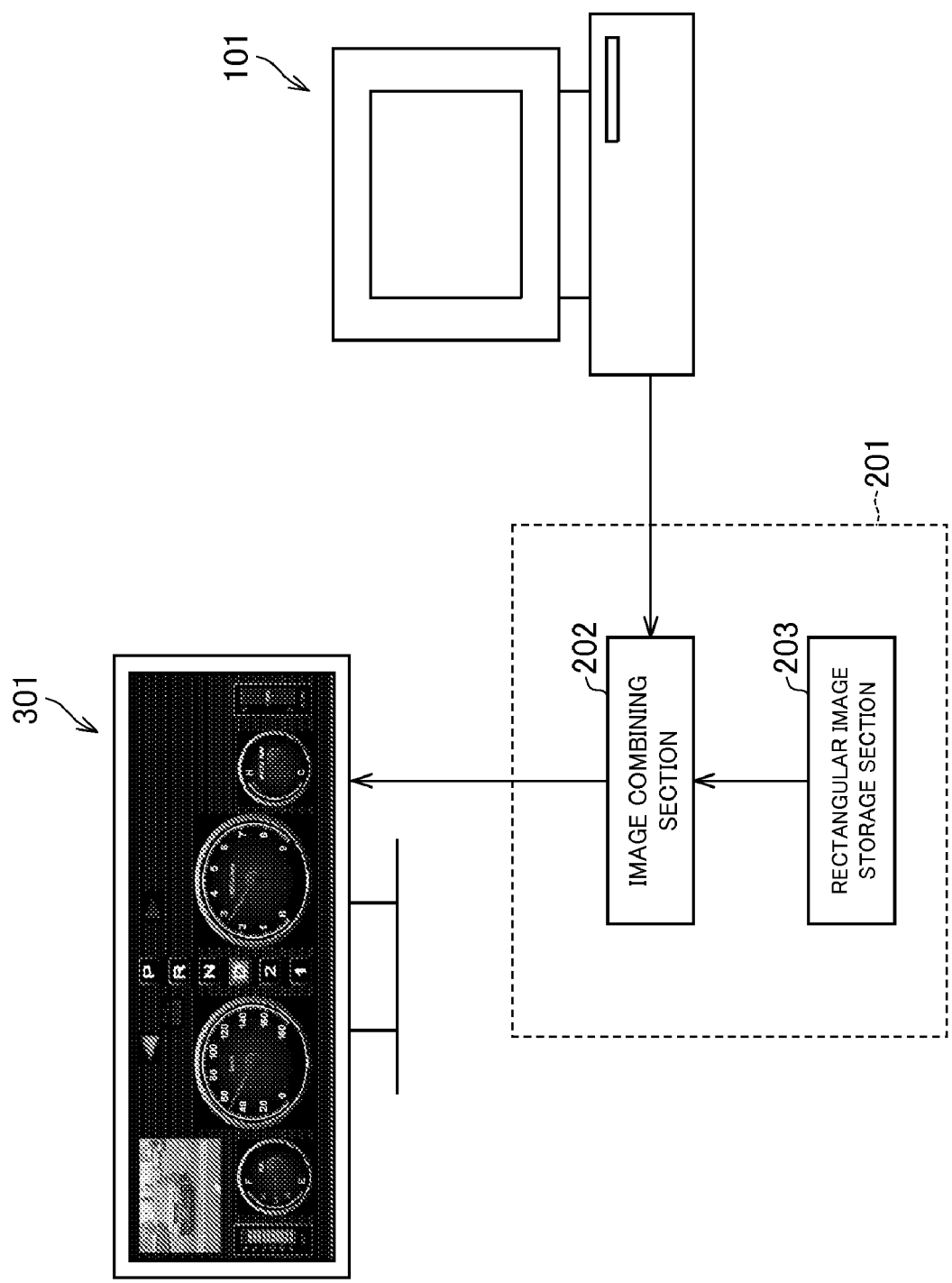
FIG. 2 is a schematic block diagram showing a diagnostic support system including the diagnostic support device shown in FIG. 1.

As shown in FIG. 2, a diagnostic support system according to the present preferred embodiment preferably includes a diagnostic support device 101, an image combining apparatus 201, and a display device (on-board display device) 301.

The diagnostic support device 101 outputs, to the image combining apparatus 201, layout information corresponding to respective composite target images (rectangular image) constituting a composite image that becomes an instrument panel image displayed on the display device 301. The diagnostic support device 101 will be explained below in detail. By combining images (composite target images) corresponding to information supplied from each device mounted a vehicle, an instrument panel image can be obtained.

The layout information includes commands such as scaling ratio, size of a displayed portion in partial display, display position of each of the rectangular images, and processing (color and transparency) in an overlapping section. That is, each of the rectangular images corresponds to a command string composed of a plurality of commands, the command string including layout information. In the following explanation, the layout information is termed command string.

The image combining apparatus 201 includes an image combining section 202 arranged to receive command strings from the diagnostic support device 101 and output to the display device 301 composite target images corresponding to the command stings; a rectangular image storage section 203 arranged to store a plurality of composite target images as a rectangular image, the composite target images being constituents for constituting a composite image to be displayed on the display device 301.

That is, the image combining section 202 reads, from the rectangular image storage section 203, each of the rectangular images corresponding to the received command strings, and outputs, to the display device 301, each of the rectangular images along with the command strings including commands indicating position to be displayed and the like.

The display device 301 includes a liquid crystal panel used as an instrument panel of a vehicle, and displays each of the composite target images outputted from the image combining apparatus 201 in an appropriate position, size, color and the like according to each of the command strings.

The image combining section 202 reads, from the rectangular image storage section 203, three rectangular images (rectangle 1 through rectangle 3) shown in FIG. 3A to FIG. 3C, and outputs, to the display device 301, information of disposed rectangular images according to the command strings as shown in FIG. 3D.

As shown in FIG. 4, the command strings are stored in a layout information storage section 102 (FIG. 1) which will be explained later. In the explanation, each of the command strings corresponding to each of the rectangle is termed layout information. It should be noted that in FIG. 4, a command string corresponding to previous processing is shown in addition to the rectangle 1 through rectangle 3. This previous processing mainly includes the following two processing.

First processing is a processing for clearing a layer used for combining images. Second processing is a processing for deciding an input port to which a moving image is inputted when an image is not a still image but a moving image such as an input from a CCD camera or an image of navigation.

The layout information storage section 102 is included in the diagnostic support device 101. However, it should be noted that the layout information storage section 102 may not be included in the diagnostic support device 101. The diagnostic support device 101 can refer to an external storage device according to need.

Figure 1:
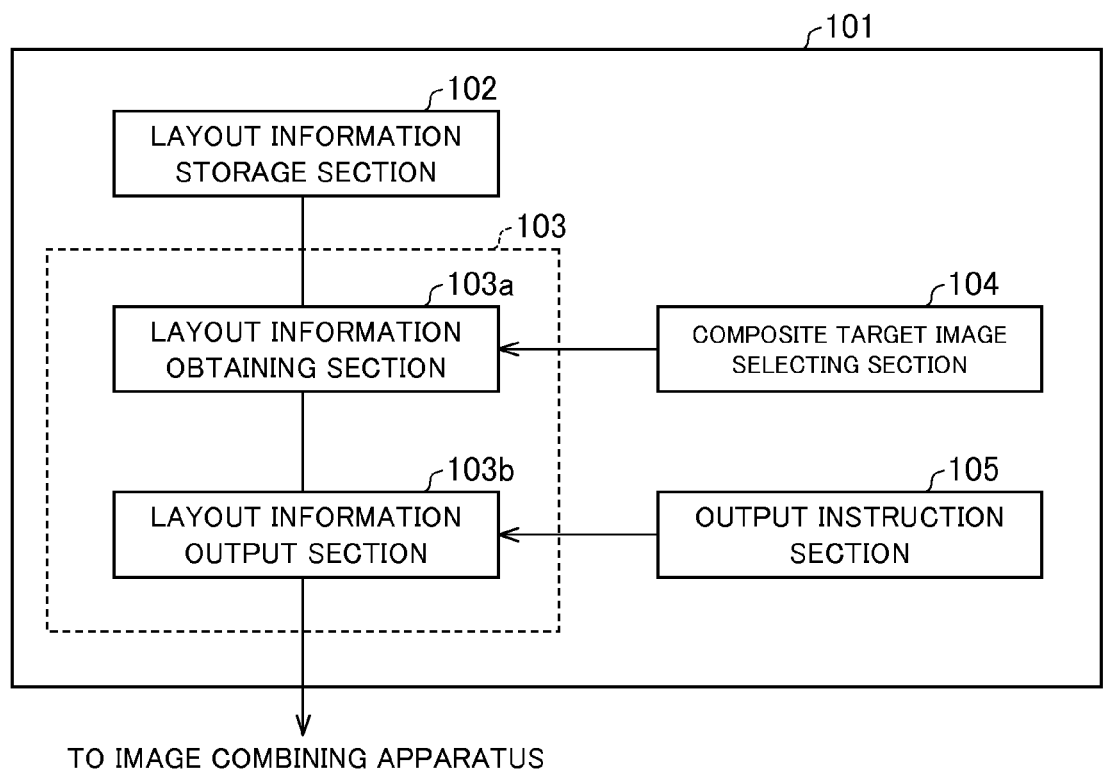
FIG. 1 shows a preferred embodiment of the present invention and is a block diagram showing the substantial portion of a diagnostic support device.

As shown in FIG. 1, the diagnostic support device includes, in addition to the layout information storage section 102, an information obtaining output section 103 arranged to obtain a command string from the layout information storage section 102 and output to the image combining apparatus 201; a composite target image selection section 104 arranged to select a composite target image; and an output instruction section 105 arranged to instruct the output of the command string.

The information obtaining output section 103 includes a layout information obtaining section 103a arranged to obtain layout information from the layout information storage section 102; and a layout information output section 103b arranged to output, to the image combining apparatus 201, the layout information, for each rectangular image, obtained by the layout information obtaining section 103a. The layout information output section 103b outputs, to the image combining apparatus 201, a command string indicating the layout information, for each rectangular image, obtained by the layout information obtaining section 103a.

Thus, by outputting the command string for each rectangular image to the image combining apparatus 201, it is possible for the image combining apparatus 201 to display a composite image composed of each rectangular image on the display device 301. This makes it possible for a user who diagnoses a screen to confirm a composite image for each rectangular image just by looking at an image displayed on the display device 301.

In the present preferred embodiment, layout information is outputted in the order predetermined by the instruction of the output instruction section 105. Thus, for example, a user can output the layout information according to his or her own will by operating the output instruction section 105. That is, because the user can output, to the image combining apparatus 201, the layout information according to his or her own will, it is possible to display rectangular images, on the display device 301 in the order the user instructed, the rectangular images being composite target images.

The command strings are outputted when an instruction from the output instruction section 105 is inputted to the layout information output section 103b. However, the layout information output section 103b outputs the command strings based on not only instructions from the external section but also output instruction information included in the command strings. For example, if the final command of a command string corresponding to a rectangle image is a command indicating that it is the final command concerning the rectangular image, the command string can be outputted just by confirming the command.

The following explains a case of a speedometer image as a composite image produced by combining operation performed by the image combining apparatus 201.

Figure 5A:
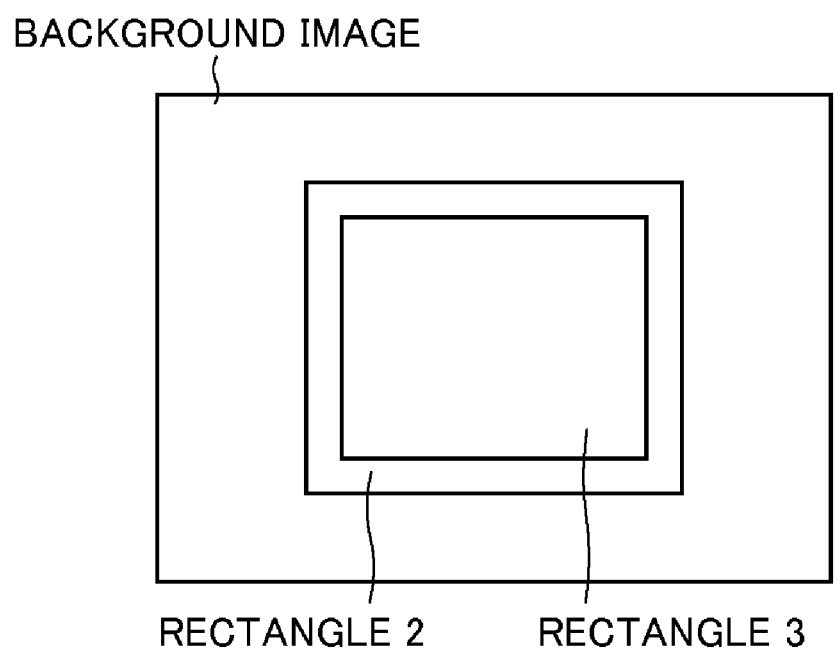
FIG. 5A is a conceptual diagram explaining a method for diagnosing a screen status in the diagnostic support device of the present invention.
Figure 5B:
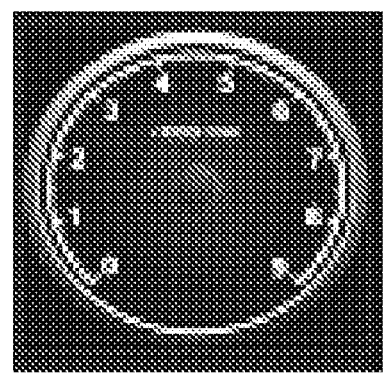
FIG. 5B is a conceptual diagram explaining a method for diagnosing a screen status in the diagnostic support device according to a preferred embodiment of the present invention.

For example, as shown in FIG. 5A, a speedometer image as shown in FIG. 5B is obtained by laying the rectangle 2 that becomes a dial image of the meter on a background image and laying the rectangle 1 that is smaller than the rectangle 2 and becomes a needle on the meter on the rectangle 2. In this case, corners become transparent in the rectangle 2 and portions other than the needle become transparent in the rectangle 1. Such information is included in a command string corresponding each of the rectangles.

However, when the whole of the image is formed by composite images as described above, there are cases in which thus formed image is different from the image user (mainly a designer of an instrument panel image) has intended.

In this case, by displaying the rectangles one by one, it is possible to discover which rectangle is different from the intended image when displayed.

In a diagnostic support device according to a preferred embodiment of the present invention, it is possible to find a problem by displaying rectangles one by one in the case in which a composite image is different from an image that a user has intended. The following explains a method for diagnosing in a diagnostic support system in detail.

In the present preferred embodiment, a composite target image (rectangular image) constituting a composite image is regarded as a component, and a command string necessary for display is stored as layout information in the layout information storage section 102. In this case, as a method for distinguishing the layout information of rectangular images from each other, a method in which each of the layout information per rectangular image is filed separately is preferably used. It should be noted that it is possible to use a method for setting a separation flag between pieces of layout information corresponding to the rectangular images. It is possible to use any methods as long as the layout information can be divided per rectangular image.

Figure 6:
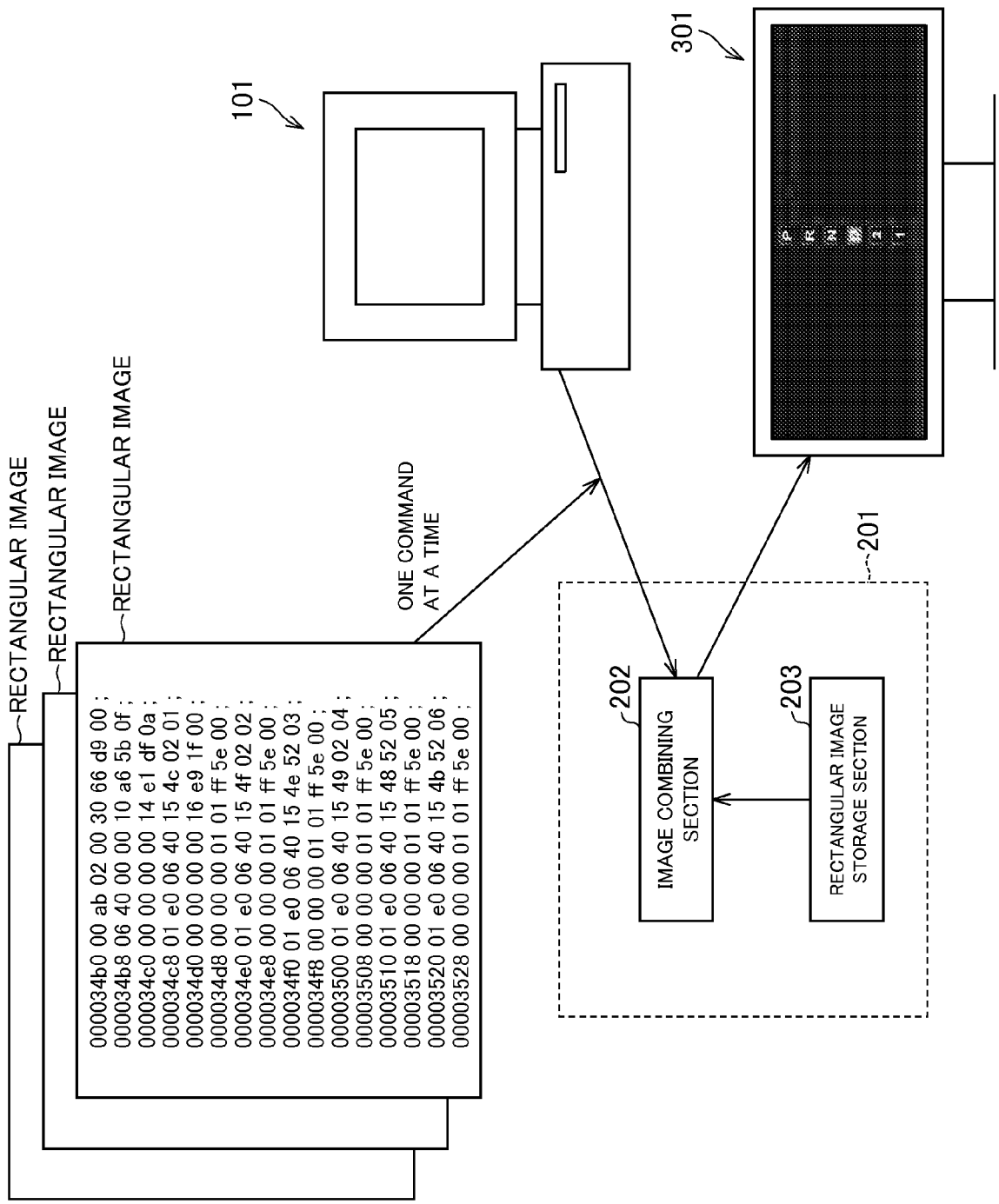
FIG. 6 is a schematic block diagram of the diagnostic support system for realizing the method for diagnosing a screen status shown in FIGS. 5A and 5B.

FIG. 6 is a schematic block diagram of the diagnostic support system.

Figure 7:
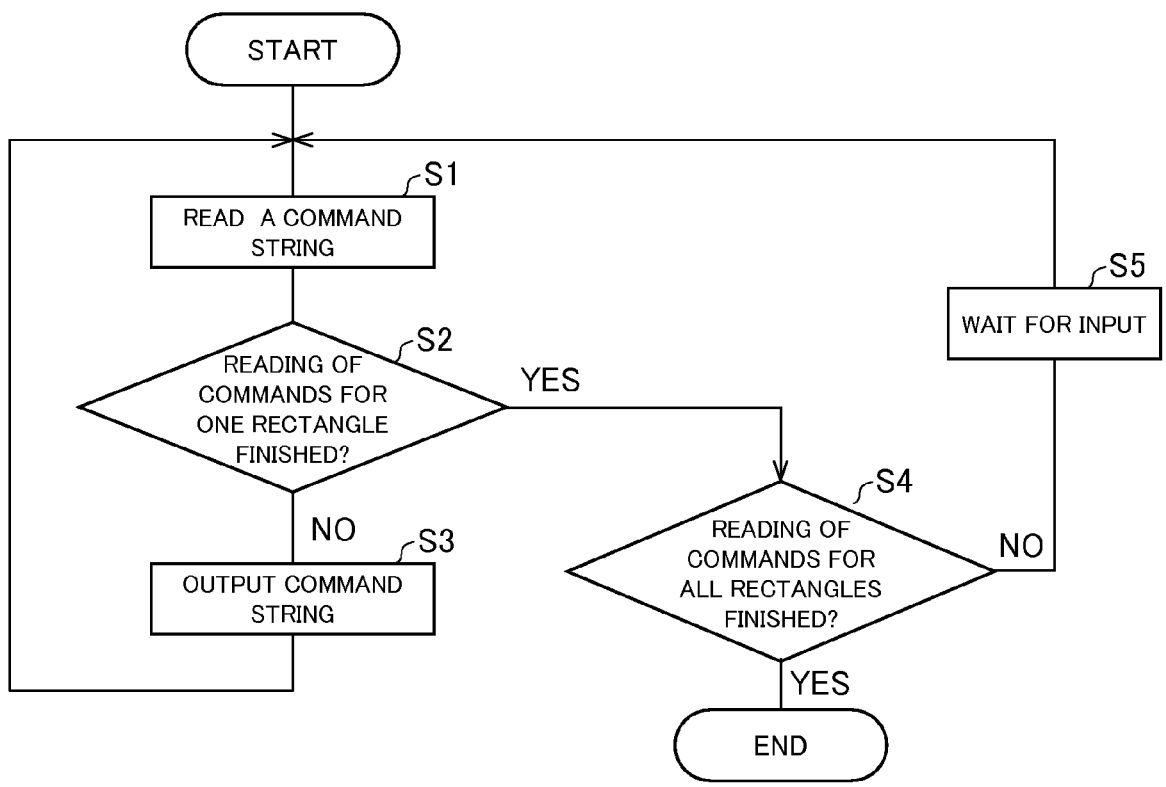
FIG. 7 is a flowchart showing a flow of diagnostic support processing using the diagnostic support system shown in FIG. 6.

FIG. 7 is a flowchart showing a flow of diagnostic support processing using the diagnostic support system shown in FIG. 6.

Figure 8:
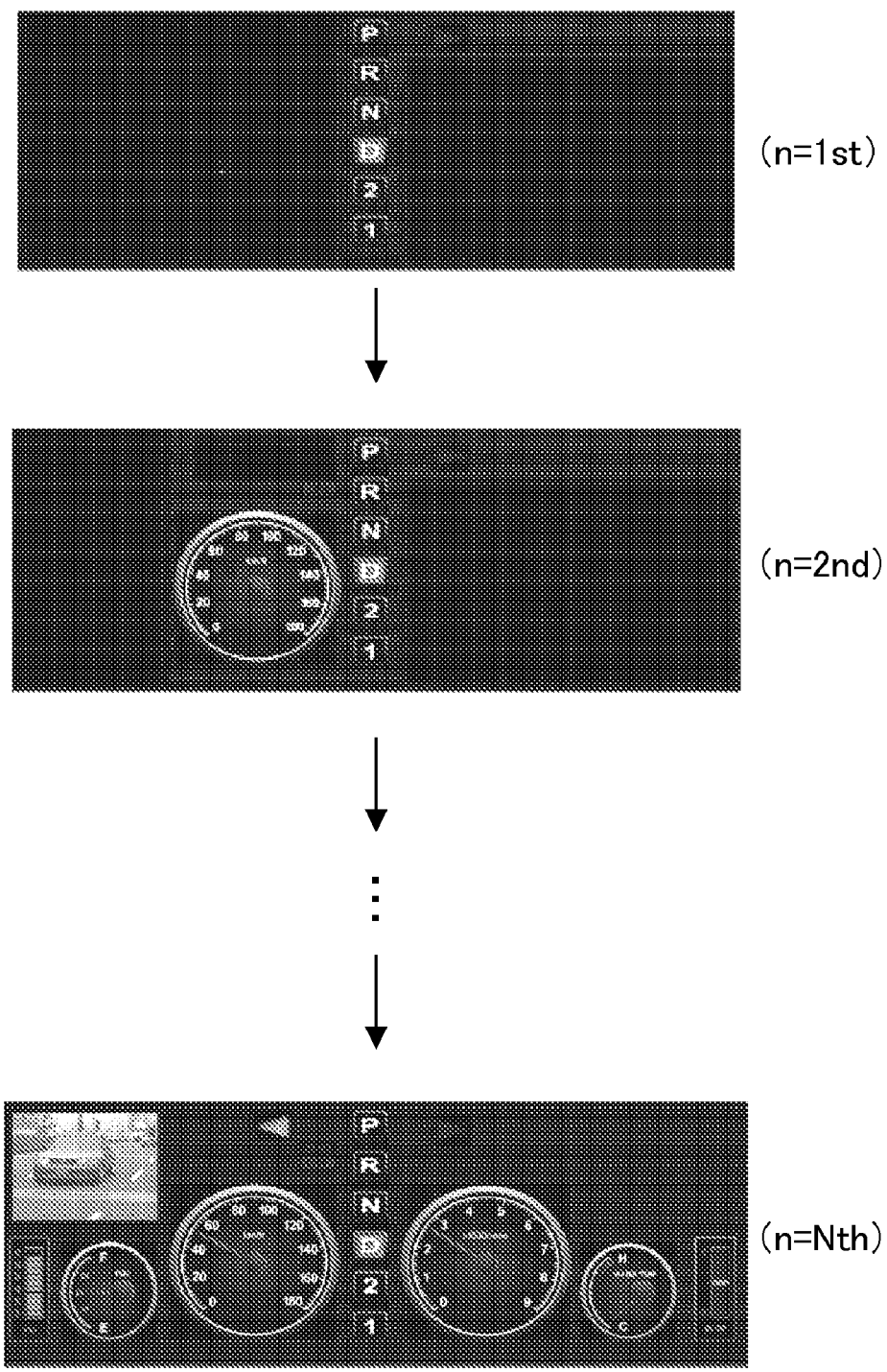
FIG. 8 is a diagram showing exemplary images displayed on a display device while carrying out the diagnostic support processing shown in FIG. 7.

FIG. 8 is a diagram showing exemplary images displayed on a display device while carrying out the diagnostic support processing shown in FIG. 7.

Let N be the number n of rectangular images which are composite target images constituting a composite image.

First, press a diagnosis start button (not illustrated) of the diagnostic support device 101. This starts the diagnostic support operation.

When the diagnostic support operation starts, the diagnostic support device 101 reads commands one by one from command strings corresponding to rectangular images (step S1).

Next, the diagnostic support device 101 judges whether reading of the commands for each rectangle (each rectangular image) has finished or not (step S2). If reading of the commands for each rectangle has not finished, the diagnostic support device 101 outputs thus read commands to the image combining apparatus 201 (step S3).

In the image combining apparatus 201 which received the commands, the image combining section 202 reads a rectangular image corresponding to the command from the rectangular image storage section 203 according to the command and outputs information of the rectangular image to the display device 301. The display device 301 reads, from the received information of the rectangular image, the rectangular image's size, transparency ratio, position to be displayed and displays the rectangular image in an appropriate position.

For example, as shown in FIG. 8, the display device 301 displays the rectangular images starting from n=1st rectangular image to n=Nth rectangular image. When the display device 301 displays n=Nth rectangular image, an instrument panel image which is a composite image is displayed.

Next, if reading of commands for one rectangle has been completed in step S2, the diagnostic support device 101 judges whether reading of commands for all of the rectangle has been completed or not (step S4). In this case, the diagnostic support device judges whether the number n of rectangular images equals with N.

If the diagnostic support device 101 judges that reading of commands for all of the rectangle has been completed in step S4, the diagnostic support device 101 terminates the diagnostic support operation. At this point, a complete composite image in which n=Nth rectangular image shown in FIG. 8 is combined is displayed on the display device 301.

If the diagnostic support device 101 judges that reading of commands for all of the rectangle has not been completed in step S4, the diagnostic support device 101 enters a standby state waiting for instructions to read commands to be inputted (step S5).

For example, when all the commands corresponding to n=1st rectangular image is read, a rectangular image of a shift lever which is n=1th component is displayed on the display device 301 as shown in FIG. 8. In this state, the diagnostic support device 101 is in a standby mode waiting for instructions to read commands to be inputted.

Finally, when the instruction to read the commands is inputted at the step S5, the step S1 is carried out again.

According to the diagnostic support system having the above arrangement, it is possible for a user (diagnostician) to confirm, one by one, each of the rectangular images constituting the complete instrument panel image, and therefore it is possible for the user to easily find which rectangular image causes the screen image to be different from the intended screen image.

The user can confirm the rectangular images one by one, as described above. Alternatively, the user can discover a problematic rectangular image by selecting a rectangular image likely to cause a screen image to be different from the intended screen image, automatically displaying the rectangular images until the selected rectangular image is displayed, and then displaying the rectangular images one by one.

The following explains this diagnostic support operation with reference to FIGS. 9A-9C and FIG. 10.

Figure 9A:
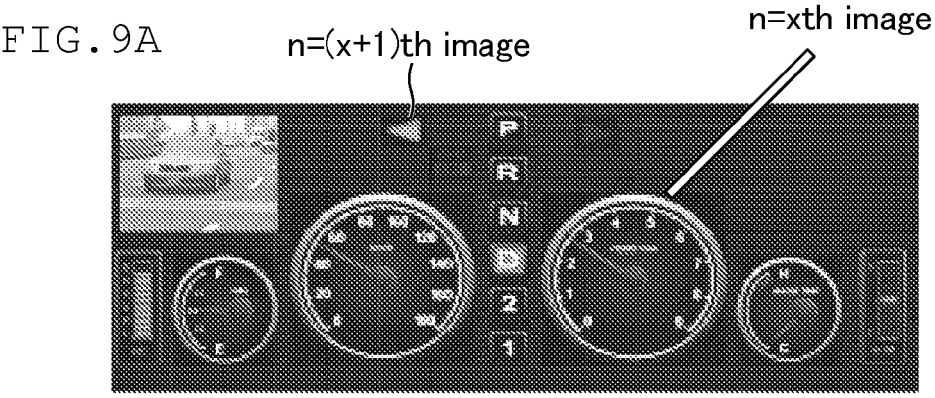
FIGS. 9A to 9C are diagrams showing exemplary images for the purpose of explaining another diagnostic support processing using the diagnostic support system shown in FIG. 6.
Figure 9B:
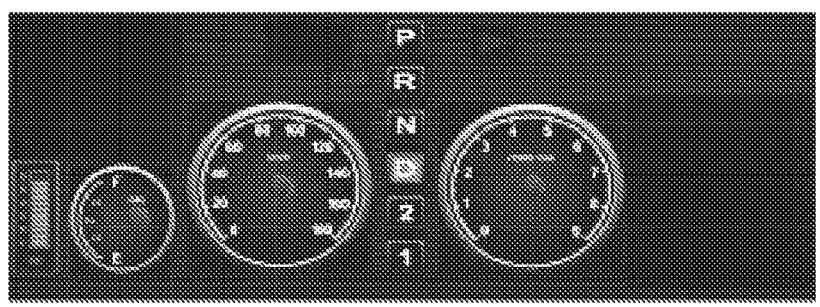
Figure 9C:
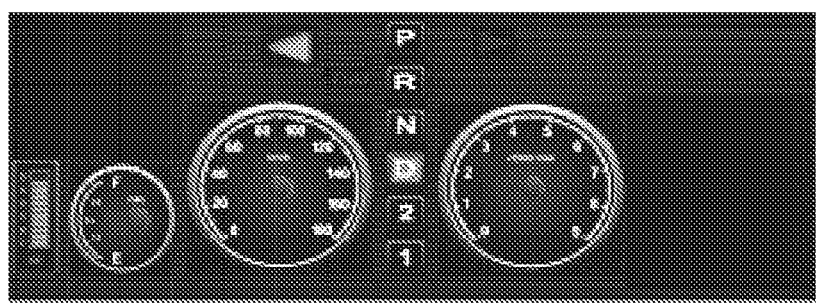

FIG. 9A-9C are diagrams showing exemplary images displayed on the display device 301 during this diagnostic support operation.

Figure 10:
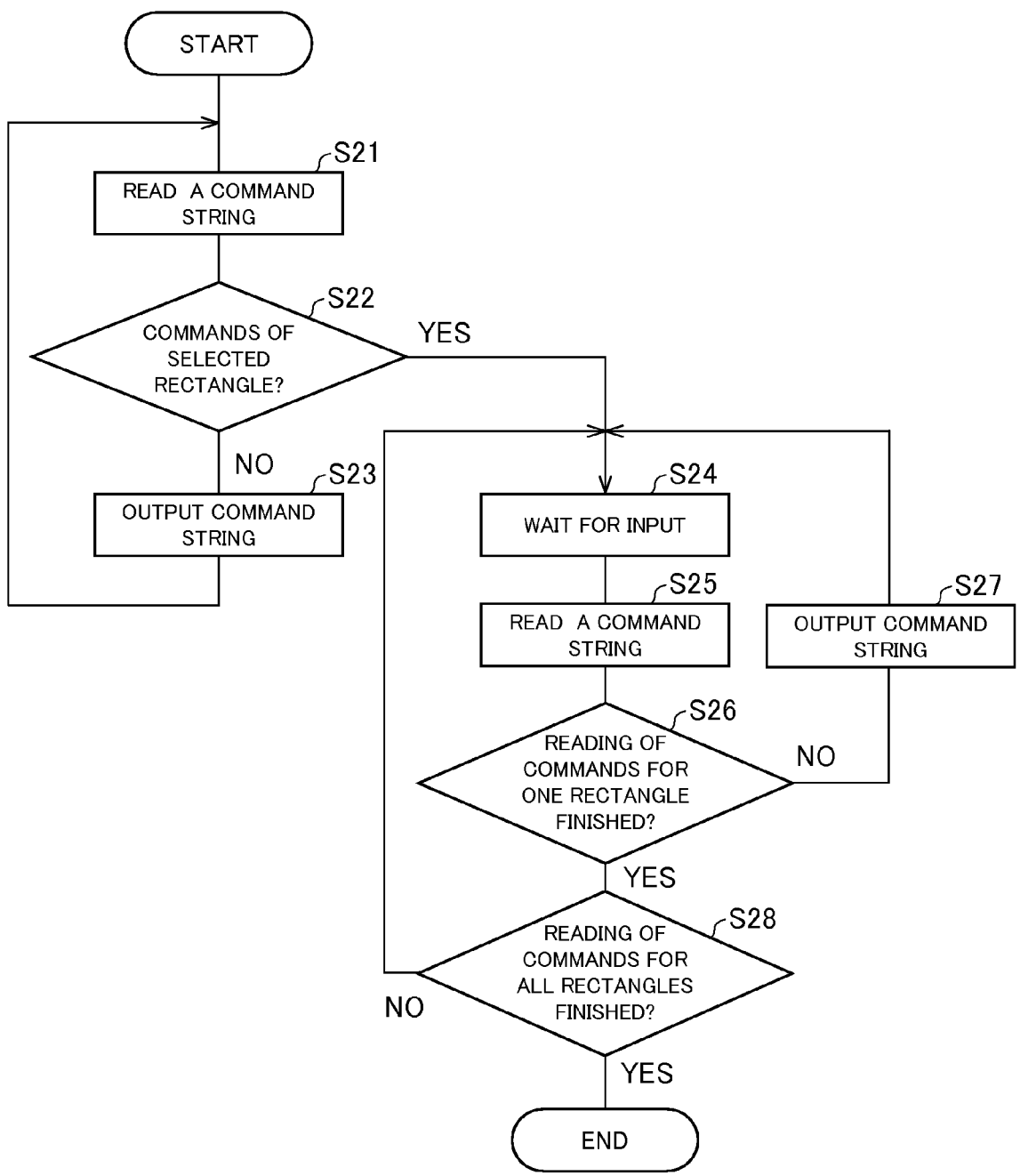
FIG. 10 is a flowchart showing a flow of diagnostic support processing shown in FIGS. 9A-9C.
Figure 11:
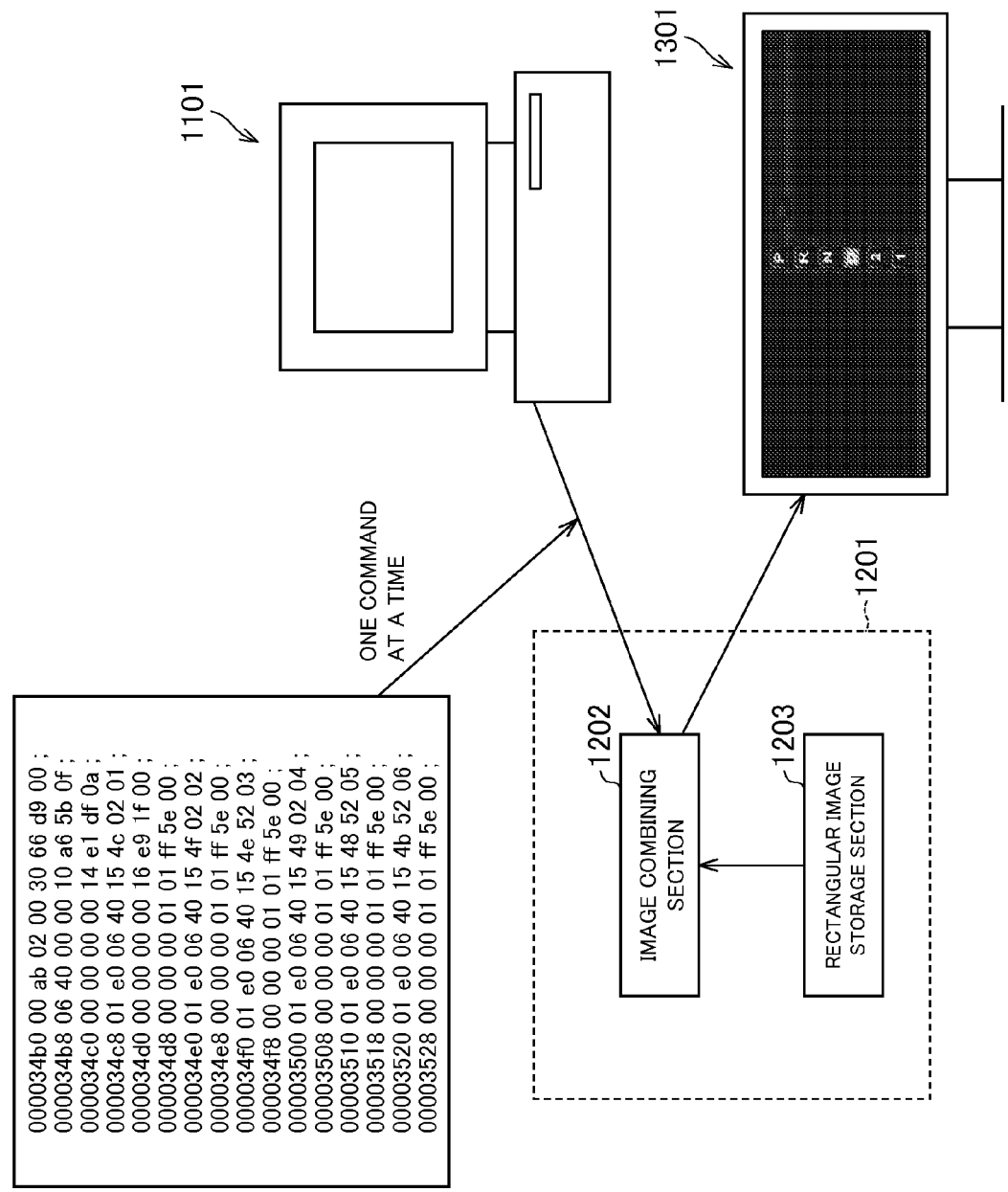
FIG. 11 is a block diagram showing substantial portion of a conventional diagnostic support system.

FIG. 10 is a flowchart showing a flow of this diagnostic support operation.

First, in a screen shown in FIG. 9A, the diagnostician selects a tachometer which is the n=xth rectangular image. The selection of this rectangular image starts the diagnostic support operation. The rectangular image is selected by a composite target image selecting section 104 shown in FIG. 1. However, to be specific, the operator selects the rectangular image by moving the cursor on the screen with a mouse. It should be noted that another method is possible in which the panel constituting the display screen is a touch panel and the user can select the rectangular image by directly touching the display device. Further, the rectangular image can be selected by pushing a keyboard corresponding to each of the rectangular images. The information of thus selected rectangular image is outputted from the composite target image selection section 104 to the layout information obtaining section 103a. This output starts the diagnostic support operation performed by the diagnostic support device 101.

First, when the diagnostic support operation starts, the diagnostic support device 101 reads commands one by one from a command string corresponding to the rectangular image (step S21).

Next, the diagnostic support device 101 judges whether the command string corresponds to the selected rectangle (step S22). Specifically, the diagnostic support device 101 judges whether the number n of the rectangular images equals with x.

If the diagnostic support device 101 judges that the command string does not correspond to the selected rectangle at the step S22, the read command is outputted to the image combining apparatus 201 (step S23).

In the image combining apparatus 201 which received the command, the image combining section 202 reads, according to the command, the rectangular image corresponding to the command with reference to the rectangular image storage section 203 and outputs the rectangular image information to the display device 301. The display device 301 reads, from the received rectangular image information, the rectangular image's size, transparency ratio and display position and the like and displays the rectangular image in an appropriate position.

The display device 301 displays rectangular images one by one until n=xth rectangular image is displayed, for example, until an instrument panel image shown in FIG. 9A is canceled and the selected rectangular image is displayed.

Next, if the diagnostic support device 101 judged at the step S22 that the command string corresponds to the selected rectangle, the diagnostic support device 101 outputs the command string to the image combining apparatus 201 and enters a standby state waiting for instruction to be inputted (step S24). As shown in FIG. 9B, the n=xth rectangular image is displayed on the display device 301.

When the instruction is inputted to the diagnostic support device 101 at the step S24, the diagnostic support device 101 reads a command string corresponding to next rectangular image, that is, the n=(x+1)th rectangular image (step S25).

Next, the diagnostic support device 101 judges whether reading of the command string for the rectangle has been completed or not (step S26).

If reading of a command string for the rectangle has not been completed, the diagnostic support device 101 outputs the read command to the image combining apparatus 201 (step S27) and enters a standby state waiting for instructions to be inputted (step S24).

If the diagnostic support device 101 judges that reading of the command string for the rectangle has been completed, the diagnostic support device 101 judges whether command strings for all of the rectangle have been read (step S28).

If the diagnostic support device 101 judges that command strings for all of the rectangle have been read, the diagnostic support operation is terminated.

If the diagnostic support device 101 judges that command strings for all of the rectangle have not been read, again the step S24 is carried out and the diagnostic support device 101 enters a standby state waiting for instructions to be inputted.

For example, when all the commands corresponding to the n=1st rectangular image, the display device 301 displays, as shown in FIG. 8, a rectangular image of a shift lever which is the n=1st component. In this state, the diagnostic support device 101 is in a standby state waiting for instructions to read commands to be inputted.

Finally, at the step S24, the instruction to read commands is inputted, the step S25 is carried out again and operation of reading the commands is executed. As shown in FIG. 9C, the display device 301 displays the n=(x+1)th rectangular image.

The diagnostic support processing as described above makes it possible to directly select, from a composite image displayed in the final screen, a rectangular image which seems to cause a problem and automatically display the rectangular image until the selected rectangular image is displayed. Therefore, it is unnecessary for the diagnostician to carry out an operation to display rectangular images which seem to have no problem. This makes it possible for the diagnostician to find a problematic rectangular image speedily and easily.

In the present preferred embodiment, the diagnostic support device 101 directly reads and outputs a command string. It should be noted that the present invention is not limited to this. Alternatively, for example, the diagnostic support device 101 can cause the image combining apparatus 201 to read a command string.

In this case, the image combining apparatus 201 carries out substantially the same process as the diagnostic support device 101. That is, the image combining apparatus 201 can carry out substantially the same process as shown in the flowchart of FIG. 7. However, because the image combining apparatus 201 reads a command string, the step S3 in which commands are outputted can be skipped.

The present preferred embodiment is an exemplary case in which a composite target image preferably has a rectangular shape. It should be noted that the present invention is not limited to this. Alternatively, a composite target image may have a shape such as circular, substantially circular, substantially rectangular or other suitable shapes, provided it is possible to recognize each of the components constituting an instrument panel image.

The present invention is not limited to the aforementioned preferred embodiments and can be varied or changed within the scope of the accompanying claims. Also, various embodiments obtained by suitable combinations of technical features, elements or arrangements disclosed in the different preferred embodiments are also included within the technical scope of the present invention.

For example, another arrangement is possible in which a diagnostic support device according to a preferred embodiment of the present invention is a diagnostic support device arranged to support the development of an on-board display device arranged to display a composite image combined based on a plurality of pieces of image information stored in an image storage section and layout information of a composite image obtained by the plurality of pieces of image information, the plurality of image information stored in the image storage section being rectangular image information, the layout information per rectangular image information being outputted to an image combining section arranged to combine the composite image.

In this case, it is possible to output layout information for each step of displaying a rectangular image. Therefore, it is possible to confirm a composite image per rectangular image.

Further, another arrangement is possible in which the layout information for each step of displaying the rectangular image is outputted to the image combining section.

In this case, the layout information is outputted in the order of the composite image. Therefore, the rectangular images are combined one by one and then displayed. That is, it is possible to confirm a process of combining images by each step.

Further, another arrangement is possible in which when the layout information of a rectangular image is selected, the layout information is outputted until the step of the selected rectangular image is displayed, and then the layout information for each step is outputted to the image combining section.

In this case, the layout information is outputted until the step of the selected rectangular image is displayed. After that, the layout information is outputted in the order of the composite image. Therefore, it is possible to confirm a composite image at any step. Further, after that, the layout information for each step is outputted to the image combining section. Therefore, the rectangular images which are combined one by one can be confirmed.

Finally, each block of the diagnostic support device 101, especially the layout information obtaining section 103a and the layout information output section 103b may be realized by way of hardware or software as executed by a CPU as follows.

That is, the diagnostic support device 101 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. Various advantages of preferred embodiments of the present invention can also be achieved by mounting to the diagnostic support device 101 a computer-readable storage medium containing control program code (executable program, intermediate code program, or source program) for the diagnostic support device 101, which is software realizing the aforementioned functions, in order for the computer (or CPU, MPU) to retrieve and execute the program code contained in the storage medium.

Examples of the recording medium include a tape such as a magnetic tape and a cassette tape; a magnetic disc such as a floppy disc (registered trademark) and a hard disc; an optical disc such as a CD-ROM/MO/MD/DVD/CD-R; a card such as an IC card (inclusive of a memory card)/optical card; and a semiconductor memory such as a mask ROM, an EPROM, an EEPROM, and a flash ROM.

Further, the diagnostic support device 101 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

A diagnostic support device according to a preferred embodiment of the present invention is a device for supporting a diagnosis of a display screen of a display device in which a plurality of images are combined and then displayed. Therefore, the diagnostic support device according to a preferred embodiment of the present invention is applied suitably to an on-board display device for displaying an instrument panel image by combining every kind of information, for each rectangle, from a vehicle.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A diagnostic support system adapted to support a diagnosis of a display state of a composite image displayed on an on-board display device to display a composite image obtained by combining a plurality of composite target images corresponding to pieces of information supplied from respective devices mounted on a vehicle, the plurality of composite target images being combined with reference to layout information respectively corresponding to each of the plurality of composite target images, the diagnostic support system comprising:
an image combining apparatus;
a layout information obtaining section arranged to obtain the layout information; and
a layout information output section arranged to output the layout information for each composite target image to the image combining apparatus, the image combining apparatus being arranged to combine the plurality of composite target images, and the layout information being obtained by the layout information obtaining section; wherein
the image combining apparatus is arranged to combine the plurality of composite target images by adding one composite target image at a time to any previously added composite target image in accordance with the layout information received from the layout information output section to display a composite image containing the one composite target image and the any previously added composite target image; and
the layout information output section is arranged to judge whether or not there is output instruction information for outputting the layout information, and to output the layout information per image composite target image only when there is output instruction information.

2. The diagnostic support system according to claim 1, further comprising an input section arranged to input the output instruction information to the layout information output section, the layout information output section being arranged to output the layout information per composite target image, when the output instruction information is inputted by the input section.

3. The diagnostic support system according to claim 1, further comprising a selection section arranged to select the composite target images, the layout information output section outputs, one by one, layout information per composite target image, until layout information corresponding to a composite target image selected by the selection section is outputted.

4. A diagnostic support system comprising:
an image combining apparatus arranged to combine a plurality of composite target images corresponding to pieces of information supplied from respective devices mounted on a vehicle, the plurality of composite target images being combined with reference to layout information respectively corresponding to each of the plurality of composite target images;
an on-board display device arranged to display a composite image obtained by the image combining apparatus;
a diagnostic support device arranged to support a diagnosis of a display state of a composite image displayed on an on-board display device; and
the diagnostic support device including:
a layout information obtaining section arranged to obtain the layout information; and a layout information output section arranged to output the layout information for each composite target image to the image combining apparatus, the image combining apparatus being arranged to combine the plurality of composite target images, and the layout information being obtained by the layout information obtaining section; wherein the image combining apparatus is arranged to combine the plurality of composite target images by adding one composite target image at a time to any previously added composite target image in accordance with the layout information received from the layout information output section to display a composite image containing the one composite target image and the any previously added composite target image; and the layout information output section is arranged to judge whether or not there is output instruction information for outputting the layout information, and to output the layout information per image composite target image only when there is output instruction information.

5. The diagnostic support system according to claim 4, wherein the image combining apparatus includes:

a composite target image storage section arranged to store a plurality of composite target images therein; and an image combining section arranged to combine the plurality of composite target images with reference to the layout information and to output thus combined composite image to the display device.

6. A non-transitory computer readable medium storing a computer program with a program code for performing, when the computer program runs on a computer, a method for supporting a diagnosis of a display state of a composite image displayed on an on-board display device for displaying a composite image obtained by combining a plurality of composite target images corresponding to pieces of information supplied from respective devices mounted on a vehicle, the plurality of composite target images being combined with reference to layout information respectively corresponding to each of the plurality of composite target images, the diagnostic support method comprising the steps of:

obtaining the layout information; and outputting the layout information for each composite target image to an image combining apparatus, the image combining apparatus combining the plurality of composite target images and the layout information obtained in the obtaining step; wherein the obtaining step includes combining the plurality of composite target images by adding one composite target image at a time to any previously added composite target image in accordance with the layout information received from the outputting step to display a composite image containing the one composite target image and the any previously added composite target image; and the obtaining step includes judging whether or not there is output instruction information for outputting the layout information, and to output the layout information per image composite target image only when there is output instruction information.

* * * * *